Sept. 25, 1956  J. M. HAGGARD  2,764,129
CATTLE CHUTE
Filed March 22, 1954
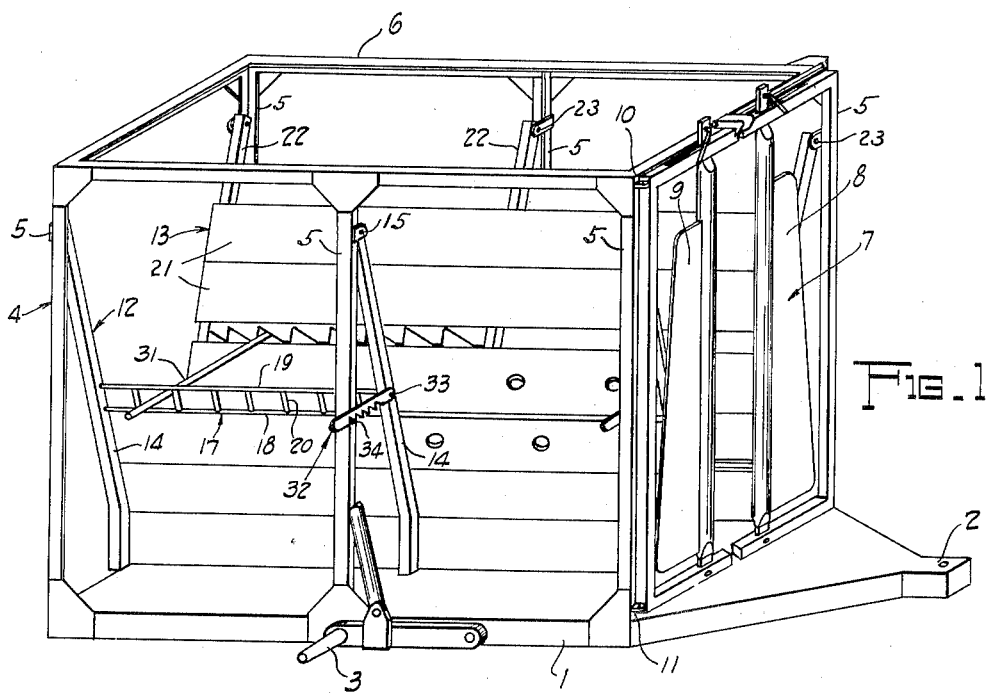
Fig. 1
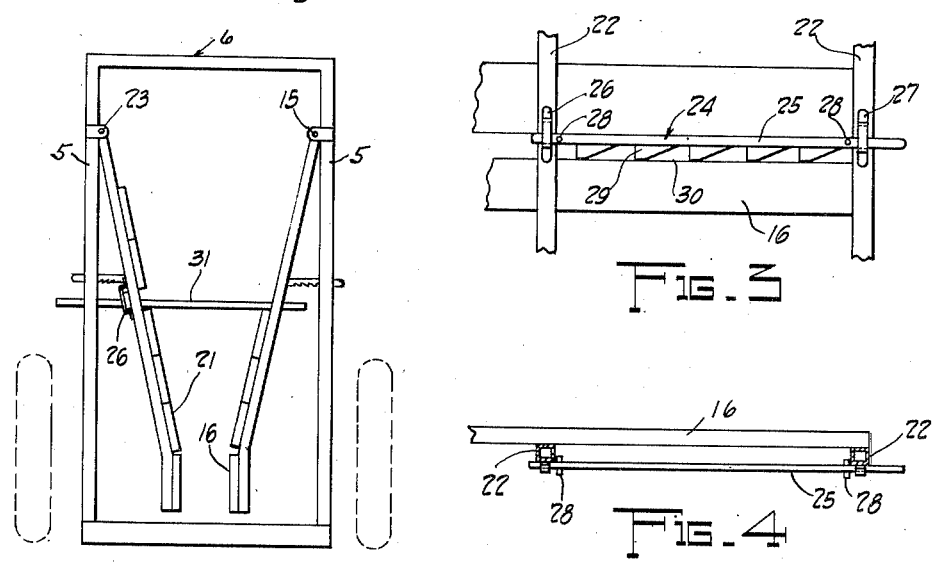
Fig. 2
Fig. 3
Fig. 4
INVENTOR.
JOHN M. HAGGARD
BY Robb & Robb
attorneys United States Patent Office 2,764,129
Patented Sept. 25, 1956

2,764,129

CATTLE CHUTE

John M. Haggard, Delphi, Ind., assignor to Delphi Products Company, Incorporated, Delphi, Ind., a corporation Application March 22, 1954, Serial No. 417,848

2 Claims. (Cl. 119—99)

This invention relates to cattle chutes and more particularly to improved means for positioning and restraining animals therein.

While the invention is primarily for use in portable chutes the application thereof to other types will be understood, particularly when it is pointed out that it has decided advantage for use by veterinarians, who of necessity require that an animal be maintained in virtually immovable position for operating purposes.

Specifically describing the invention, it may be stated that the device of this invention is comprised of parts which used in conjunction with a cattle chute may be availed of to squeeze an animal forwardly and control movement in the chute. By appropriate manipulation of the parts and availing of leverage, a large or small animal may be accommodated. Particularly advantageous is the fact that the person operating the device may take a safe position and manipulate the unit, there being automatic locking features included.

It is therefore a principal object of this invention to provide a device which may be termed a forward squeeze unit, the same being easily manipulated and adjusted to position an animal in a chute.

A further object of the invention is to provide a device of the type described which will be operable by simple means and automatically lock in position when the proper adjustment has been attained.

A still further object of the invention is to provide a unit which will maintain an animal within the chute, so as to prevent movement of the animal without injury and subsequently permitting release of the animal through the gate provided in the chute.

A further object of the invention is to provide a squeezing device which may be operated after the animal is placed in the chute, so as to force the animal forwardly, the forepart of the animal being maintained in position by a suitable gate structure, the squeezing device being automatically locked in position after the animal is positioned, all of the same being designed to restrain a large or small animal without harm or possibility of injury or movement of an undesired nature when in position.

Other and further objects of the invention will be understood from a consideration of the specification appended hereto and shown in the drawing wherein:

Figure 1 is a perspective view showing the cattle chute in general and various parts comprising the same, including the squeezing device or unit which is availed of for maintaining the animal in position, the said chute being shown as a trailer unit with the wheels removed.

Figure 2 is a rear elevational view of the chute showing the relationship of the various parts, the wheels being indicated in dotted lines therein.

Figure 3 is an enlarged fragmentary view taken looking from the left side of Figure 2, showing the form of the ratchet or rack portion of the squeezing device.

Figure 4 is a top view of the fragmentary disclosure of Figure 3 showing further the relationship of the parts of the squeezing device.

Referring now to Figure 1, the chute is shown as comprising a base or platform generally designated 1, the same being suitably equipped with the part at the front designated 2 so as to permit engagement with and towing by a vehicle. The base or platform 1 is further equipped with the axles 3, one provided at each side which may be adjustably positioned so as to raise or lower the base 1, the axles 3 being obviously to receive suitable wheels thereon for transport of the chute.

Extending above and connected to the platform 1 is the substantially rectilinear frame generally designated 4 which comprise the six upright members each designated 5, and in turn connected at their upper parts or ends with a rectangular frame 6. The uprights 5 and the rectangular frame 6 may preferably be formed of square or rectangular tubing or angle stock as may be found desirable, all of the parts being welded or otherwise fastened as will be apparent.

At the forward end of the base or platform 1 and the frame 4 is a gate unit generally designated 7 which may be in the form of a stanchion, and includes the respective gate members 8 at one side and 9 at the other, which are hingedly connected at their outer edges at the upper and lower corners as at 10 and 11 to the frame 4 so as to swing outwardly and permit the animal to move therethrough. Inasmuch as the particular form of gate is not essential to the invention herein, the same is shown as only generally constructed, and may assume other forms if desired. It should be noted however that suitable adjustment is provided for the respective gate members 8 and 9 to accommodate different sized animals, the neck of the animally usually being engaged between the respective side members just behind the head of the animal.

Suitably mounted on the frame 4 and within the same are the side members generally designated 12 and 13. The side 12 will first be described, and is shown as comprising a series of parallel members 14, the members 14 being connected at their upper ends in pivotal engagement as shown somewhat in greater detail in Figure 2 at 15 to the upright members 5 of the frame 4. The parts 14 are usually equipped with heavy wooden side elements 16, suitably fastened in any preferred manner to the members 14 and extending longitudinally of the frame as will be understood. The side 12 is thus a hingeable or swingable side as will be clear, being susceptible of swinging toward and from the side 13 to be described hereinafter.

Mounted part way up and between two of the members 14, at the rear of the side 12, is a fulcrum unit designated generally 17, which unit may be formed of rod or bar stock in the general shape of a ladder having longitudinal members 18 and 19 suitably fixed to the parts 14 at their respective ends, and the vertical fulcrum parts 20 extending between the members 18 and 19 for purposes to be hereinafter explained.

At the opposite side of the frame, the side member 13 is shown as having correspondingly mounted thereon the boards or other suitable parts 21 which extend longitudinally and engage the members 22 which correspond to the members 14 of the side 12. The members 22 are obviously similarly pivotally connected at their upper ends at 23 to the uprights 5.

Intermediate the upper and lower ends of the members 22 and substantially parallel and in line with the fulcrum unit 17, is the locking part of the squeezing device, said part as shown in Figure 3 including a rack or ratchet unit 24 which comprises a bar 25 extending between two of the members 22, one end of the bar 25 being mounted in a saddle 26 and the other end being mounted in a suitable saddle 27 similar to the saddle 26. The bar 25 may be also equipped with pins or similar members 28 adapted to engage the saddles 26 and 27 and permit the raising and lowering of the unit 24 in those saddles as will be apparent, but preventing endwise displacement of the unit. The member 24 is mounted so as to normally have its rack members 29 which are substantially triangular in shape as will be clear from a consideration of Figure 3 extend downwardly a sufficient distance close to the upper edge of one of the boards 16 as indicated at 30.

Adapted to span the space between the respective sides 12 and 13, is a suitable bar 31, which bar 31 is intended to engage at one end with one of the vertically extending parts 20 of the fulcrum unit 17, and the other end to be received between the rack elements 29 of the rack 24. Thus as viewed in Figure 1 manipulation of the end of the bar 31 adjacent the side 13, the other end of the bar 31 being in engagement with one of the members 20, so as to cause the bar to move in a clockwise position as viewed in that figure will cause a raising of the rack 24 and permit the bar to slide forwardly at that end and come into engagement or position adjacent one of the other rack elements 29 provided on the rack 24.

It should be noted that each of the sides 12 and 13 is equipped with a suitable adjustable locking device generally designated 32, which is pivotally connected at 33 to one of the members 14, and adapted to engage a suitable pin 34 on one of the upright members 5. This device will maintain the sides in their pivotally adjusted positions, to accommodate therewithin animals of various sizes.

Assuming that the cattle chute described is to be used for some particular type of operation on an animal for example, the sides 12 and 13, will normally be released and hang in substantially vertical position, whereafter the animal will be led into the chute, so that its neck extends between the gate elements 8 and 9, after which the gate parts 8 and 9 will be manipulated so as to grasp and surround the neck and prevent withdrawal of the head. The side members 12 and 13 are then adjusted and maintained in position by the locking parts 32 so as to closely engage the sides of the animal.

Thereafter the bar 31 is slipped across the space between the sides 12 and 13, so that one end engages the fulcrum unit 17 as by means of contact with one of the parts 20, the bar being closely adjacent the rear part of the animal. Thereafter by manipulating the other end of the bar, and causing the said bar to come into engagement with the rear part of the animal, the animal may be squeezed forwardly. When suitable forward squeezing has been effected, the bar 31 will obviously be positioned so as to engage one of the elements 29 of the rack 24 and thus remain in locked position, securely holding the animal so as to be virtually immovable in the chute.

When whatever operation or other manipulation of the animal has been completed, the gates 8 and 9 may be released, and the animal thus permitted to move outwardly from within the chute.

In view of the foregoing it will be understood that an advantageous cattle chute arrangement is shown, involving the special squeezing unit, which is adjustable so as to accommodate various sizes of animals within the chute, and force the animal into position whereby an operation may be performed without harming the animal and at the same time enabling such operation to be carried out with complete safety for the operator.

I claim:

1. In a cattle chute of the class described, in combination, a main frame having inwardly adjustable sides, outward swinging releasable gate members at one end of the frame and including means to hold the forepart of an animal therebetween, and a squeezing device comprising a fulcrum member mounted at one side of the frame, a bar spanning the space between the sides and engaging the fulcrum member at one end, and a locking member at the other side of the frame, said bar being adapted to engage the same, to be maintained in locked position at its other end, and manipulable from one end to force an animal positioned between the sides, toward the gate members aforesaid.

2. The combination as claimed in claim 1, wherein the fulcrum member includes a series of fulcrum positions, and the locking device comprises a rack having a series of elements to engage the bar and maintain the same in a plurality of locked positions.

References Cited in the file of this patent

UNITED STATES PATENTS

| | | |
|---|---|---|
| 884,179 | Mabbott | Apr. 7, 1908 |
| 1,130,062 | Bryson | Mar. 2, 1915 |
| 1,487,935 | Gray | Mar. 25, 1924 |
| 1,574,828 | Lucas | Mar. 2, 1926 |
| 2,554,558 | Bush | May 29, 1951 |
| 2,564,317 | Whitworth | Aug. 14, 1951 |
| 2,581,735 | Turner | Jan. 8, 1952 |
| 2,678,631 | Hagar | May 18, 1954 |